United States Patent [19]

Hamalainen et al.

[11] Patent Number: 5,729,541
[45] Date of Patent: Mar. 17, 1998

[54] SYSTEM FOR TRANSMITTING PACKET DATA IN RADIO TELEPHONE TDMA SYSTEMS

[75] Inventors: Jari Hamalainen, Tampere; Arto Karppanen, Helsinki; Zhi Chun Honkasalo, Vantaa; Harri Jokinen, Hiisi; Wang Ling, Espoo, all of Finland

[73] Assignee: Nokia Mobile Phones Ltd., Salo, Finland

[21] Appl. No.: 462,160

[22] Filed: Jun. 5, 1995

[30] Foreign Application Priority Data

Jun. 8, 1994 [FI] Finland ................................ 942702

[51] Int. Cl.⁶ ........................... H04Q 7/38; H04B 7/212
[52] U.S. Cl. ........................................ 370/337; 370/348
[58] Field of Search ........................ 370/95.1, 95.2, 370/95.3, 110.1, 321, 322, 336, 337, 345, 347, 348, 442, 443, 522, 524; 379/59, 60, 371, 455; 455/33.1, 33.2, 53.1, 54.1, 54.2; 371/32, 33

[56] References Cited

U.S. PATENT DOCUMENTS

| | | |
|---|---|---|
| 4,763,319 | 8/1988 | Rozenblit . |
| 4,837,800 | 6/1989 | Freeburg et al. . |
| 4,887,265 | 12/1989 | Felix . |
| 4,972,506 | 11/1990 | Uddenfeldt ........................ 370/95.1 |
| 5,008,883 | 4/1991 | Eizenhofer et al. . |
| 5,081,704 | 1/1992 | Umeda et al. ...................... 370/95.3 |
| 5,103,445 | 4/1992 | Ostlund . |
| 5,109,527 | 4/1992 | Akerberg ........................... 370/95.3 |
| 5,142,533 | 8/1992 | Crisler et al. . |
| 5,159,702 | 10/1992 | Aratake ............................. 455/33.1 |
| 5,166,929 | 11/1992 | Lo . |
| 5,199,031 | 3/1993 | Dahlin ............................... 370/95.3 |
| 5,239,678 | 8/1993 | Grube et al. ...................... 455/34.1 |
| 5,276,680 | 1/1994 | Messenger . |
| 5,404,355 | 4/1995 | Raith ................................. 370/95.1 |

(List continued on next page.)

FOREIGN PATENT DOCUMENTS

| | | |
|---|---|---|
| 0048854 A1 | 4/1982 | European Pat. Off. . |
| 0048861 A1 | 4/1982 | European Pat. Off. . |
| 0 369 535 A3 | 5/1990 | European Pat. Off. . |
| 0 399 611 A3 | 11/1990 | European Pat. Off. . |
| 0399612A2 | 11/1990 | European Pat. Off. . |
| 0587980 A2 | 3/1994 | European Pat. Off. . |
| 2 270 815 | 3/1994 | United Kingdom . |

OTHER PUBLICATIONS

"A Reservation Based Multiple Access Scheme For A Future Universal Mobile Telecommunications System", DeVile, J.M., 7th IEE Conf. on Mobile and Personal Communications 13, Dec. 15, 1993.

Finnish Office Action and English translation thereof dated 13 Mar. 1995 Finnish Patent Application No. 942702.

D. Bertsekas, R. Gallager, Data Networks, Prentice–Hall Inc., 1987 New Jersey, Chapters 2.7 and 2.8.3, pp. 91, 92, 99, 100, 101.

(List continued on next page.)

Primary Examiner—Chau Nguyen
Attorney, Agent, or Firm—Perman & Green LLP

[57] ABSTRACT

The invention relates to a method for transmitting packet data in a cellular system. The number of time slots in a TDMA frame dedicated for packet transmission varies according to transmission needs and each logical channel consisting of corresponding time slots in consecutive TDMA frames is independent of the other logical channels. A data packet is encoded in an information channel frame consisting of N-1 information bursts, and between the frames there can be an acknowledge/retransmission request burst (ARQ) reporting that a received frame was error-free or requesting retransmission. Thus, the information channel consists of repeated sequences of N bursts. Also disclosed are the structure of a packet paging burst (PP), packet random access burst (PRA), packet access grant burst (PAG), acknowledge/retransmission request burst (ARQ) as well as the use of the bursts in starting and maintaining the transmission.

39 Claims, 8 Drawing Sheets

U.S. PATENT DOCUMENTS 5,404,392  4/1995  Miller et al. .............................. 379/60
5,420,864  5/1995  Dahlin et al. .
5,430,724  7/1995  Fall et al. .
5,434,847  7/1995  Kou .

OTHER PUBLICATIONS

Electronics and Communiction Journal, vol. 5, No. 3, 1 Jun. 1993, pp. 180–186, Dunlop, J., "A Reservation Based Access Mechanism For 3rd Generation Cellular Systems".

IEEE Transactions On Vehicular Technology, vol. 39, No. 4, 1 Nov.. 1990, pp. 340–351, Mitrou et al. "A Reservation Multiple Access Protocol For Microcellular Mobile-Communicatin Systems".

"European digital cellular telecommunications system (Phase 2); Physical layer on the radio path General description (GSM 05.01)" ETSI, May 1995, pp. 1–19.

"European digital cellular telecommunications system (Phase 2); Channel coding (GSM 05.03)", ESTI, Aug. 1995, pp. 1–5 and Mar. 1995, pp. 1–31.

Mouly, et al., "The GSM System for Mobile Communications", 1992, France, pp. 215–216, 231–241, 346–349.

Hodges, M.R.L., "The GSM radio interface", British Telecom Technology Journal vol. 8 No. 1, Jan. 1990, pp. 31–43.

"European digital cellular telecommunications system (Phase 2); Mobile radio interface layer 3 specification (GSM) 04.08)", ESTI, May 1995, pp. 37–40, 183–186.

IEEE Transactions On Vehicular Technology, "Voice and Data Integration in the Air–Interface of a Microcellular Mobile Communication System", vol. 42, No. 1, Feb. 93.

FIG. 1
PRIOR ART

I=INFORMATION BURST
ARQ D=ARQ ACK FOR DOWNLINK I FRAMES
ARQ U=ARQ ACK FOR UPLINK I FRAMES

| FIELD CONTENTS | POSSIBLE NUMBER OF DATA BITS |
|---|---|
| BITMAP OF FREE/RESERVED UPLINK CHANNELS | 8 BITS |
| TMPI (TEMPORARY PACKET MOBILE ID) | 25 BITS |
| CHANNEL ALLOCATION BITMAP (FOR PAGING) | MAX 8 BITS |
| RANDOM NUMBER | 8 BITS |
| CHANNEL ALLOCATION BIT MAP (FOR ACKNOWLEDGE) | MAX 8 BITS |
| TIMING ADVANCE TA | 6 BITS |
| AUTOMATIC RETRANSMISSION REQUEST ARQ | 12 BITS |

FIG.7

| FIELD CONTENTS | POSSIBLE NUMBER OF DATA BITS |
|---|---|
| TMPI (TEMPORARY PACKET MOBILE ID) | MAX 25 BITS |
| CHANNEL ALLOCATION BIT MAP | 8 BITS |
| ARQ ACKNOWLEDGE (L1 ARQ) | 12 BITS |
| BITMAP OF FREE UPLINK CHANNELS | 8 BITS |

FIG. 9

| FIELD CONTENTS | POSSIBLE NUMBER OF DATA BITS |
|---|---|
| RANDOM NUMBER INCLUDED IN PRA | 5 BITS (OR 12 IF MODIFIED ACCESS BURST) |
| (NUMBER OF REQUESTED TIME SLOTS) | 3 BITS |
| (PRIORITY) | 2 BITS OR MORE |
| CHANNEL ALLOCATION BITMAP | 8 BITS |
| TIMING ADVANCE TA | 6 BITS |
| ARQ ACKNOWLEDGE (L1 ARQ) | 12 BITS |
| BITMAP OF FREE UPLINK CHANNELS | 8 BITS |

FIG. 11

| FIELD CONTENTS | POSSIBLE NUMBER OF DATA BITS |
|---|---|
| RANDOM NUMBER (AS IN GSM) | 5 BITS OR MORE |
| NUMBER OF TIME SLOTS NEEDED | 3 BITS |
| PRIORITY (4 LEVELS) | 2 BITS |
| REQUIREMENT FOR CONSECUTIVE TIME SLOTS | 1 BIT |

| RANDOM NUMBER | No. OF TIME SLOTS | PRIORITY | CONSEC. |

SYSTEM FOR TRANSMITTING PACKET DATA IN RADIO TELEPHONE TDMA SYSTEMS

FIELD OF INVENTION

This invention relates to the transmission of packet data having flexible variable rate reservation access for TDMA-based cellular systems.

BACKGROUND OF INVENTION

Typically, cellular systems offer efficient data and speech services based on circuit switched technology. In circuit switching, however, the use of transmission resources is not optimal since the transmission link is maintained for the whole duration of the connection independent of whether or not information is being sent at a given moment. Transmission resources are also shared by many other users, and therefore maintaining a circuit switched connection for one user unnecessarily wastes the transmission resources for other users. The fact that data services are transmitted in bursts is also a disadvantage in circuit switching. Channel utilization can be improved and optimized by using packet switched transmission of information.

There have been several research projects to study packet radio for optimizing the use of channels in burst data traffic. Time division multiple access (TDMA) was not utilized in older systems. More recent research projects have studied time division based packet radio systems capable of reserving multiple time slots per use; in other words, capable of data transmission with high data rates.

A future third generation cellular system called the universal mobile telecommunication system (UMTS) has to be capable of performing both circuit switched and packet transmission, like integrated services digital network (ISDN) transmission and asynchronous transfer mode (ATM) transmission. The key factor is an air interface utilizing advanced multiple access technology for efficiently multiplexing, at the air interface, channels supporting various types of services to and from the radio path. Requirements set by the UMTS system for the air interface have been described in the article "A Reservation Based Multiple Access Scheme for a Future Universal Mobile Telecommunications System" by J. M. DeVille, published in the Mobile and Personal Communications, 13–15 Dec. 1993, Conference Publication No. 387, IEE 1993. The multiple access has to be capable of utilizing the inactivity of the information source by assigning a physical channel only when there is activity on the logical channel and, furthermore, be capable of supporting various bit rates so that, when necessary, time slots in a frame are assigned for the logical channel.

To meet these and other requirements a multiple access control method has been proposed called packet reservation multiple access (PRMA++) which is part of the proposal for third-generation cellular systems in relation to the transmission of packeted speech and data. The PRMA++ can be used as multiple access control both in packet switched and circuit switched transmission. The PRMA++ method concentrates on the use of one time slot in the transmission of packet data. This mechanism provides an efficient multi-slot/multi-user environment for a system having a high number of time slots in its TDMA frame.

Figure 1:
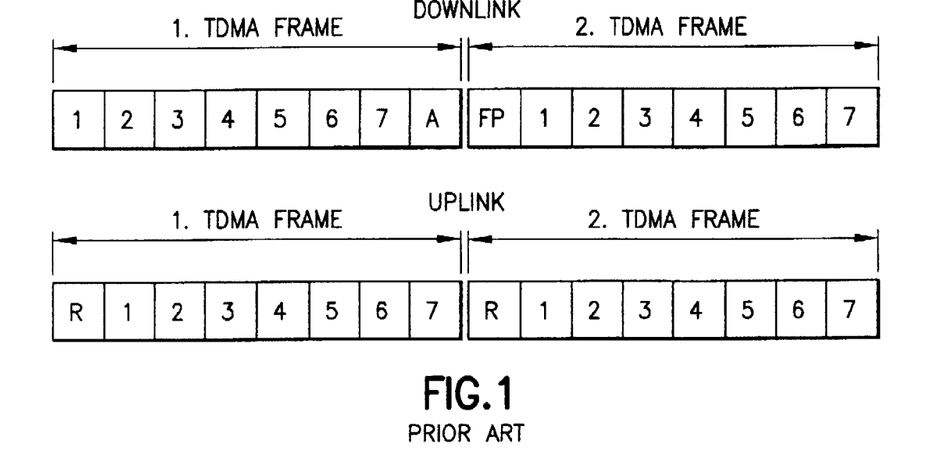
FIG. 1 shows the frame structure of the proposed UMTS system.

The PRMA++ uses time division multiple access TDMA in the radio channel. This makes it possible for a user to share radio channel transmission resources. Now follows a description of this system, with reference to FIG. 1. A TDMA frame is divided into time slots in which a transmitted burst carries data and signalling associated with channel coding, detection, etc. In the uplink direction, i.e. from a mobile station to a network (base station), there are two types of time slots: reservation time slots, or, R-slots which are used only for transmitting channel request bursts; and information time slots, or, I-slots used only for transmitting information bursts. In a channel request burst a mobile station uses a so-called air interface channel identifier including the mobile station's network address that identifies the logical channel and requesting one or more time slots of a frame for its use according to the need at that moment. In the downlink direction, i.e. from a network (base station) to a mobile station, there are also two types of time slots: I-slots for transmitting information and A-slots, or, acknowledge time slots. When a mobile station requests access to the network, the base station acknowledges the request with A-slots by sending the requesting station's address and the number of the I-slot. From then on, that I-slot is reserved for the mobile station.

Let the number N of PRMA++ time slots available in one TDMA frame be a system configuration parameter. Then, in the uplink channel there is in one TDMA frame, one reservation time slot (R-slot) and N-1 information time slots (I-slots). All mobile stations begin transmission by sending a channel request in the R-slot and if several mobile stations use the same R-slot for sending the request, collisions may occur. In the downlink channel, there Is also in a TDMA frame, in addition to the I-slots and the above-mentioned A-slot for acknowledging channel reservation requests sent in the R-slot, a fast paging time slot (FP-slot) for informing a mobile station about an incoming data transmission and the information transmission time slots.

A mobile station initiates a connection by sending a channel request on an uplink channel, in the R-slot used for this purpose by all mobile stations of a cell. The base station acknowledges the channel request with a downlink acknowledge burst in the A-slot. If no requests are sent in the R-slot or if there are collisions on the channel recognized by the base station, it sends an "idle" flag in the acknowledge burst of the corresponding A-slot and then the mobile station knows that it should send the channel request again after a while. In the case that a channel request sent in the R-slot was received without problems but there are no free time slots for transmission, the mobile station will be informed about the matter in the next downlink acknowledge time slot. The mobile station will queue for access until a free time slot is found.

An R-slot includes a training sequence, the address of the mobile station, the number of requested information time slots, and the circuit switching flag. The flag tells whether the reservation is valid for the duration of the packet or for a longer time. The channel is reserved until an instruction is given to release the reservation. The acknowledge burst in the A-slot includes the address of the mobile station requesting a channel and the channels dedicated for traffic. The mobile station receives the acknowledge burst and then sets the receiver and transmitter to the defined channel. Traffic on the channel is begun and it continues as long as there are data or speech to transmit. In packet data transmission, the number of bursts—or, in this case, packets—sent after one channel request can be fixed.

A base station uses the fast paging time slot (FP-slot) to inform a mobile station about an incoming packet. A mobile station listens to he fast paging channel and decodes all incoming messages to find its own code. The fast paging time slot includes a list of the I-slots that have been allocated to the mobile station. A mobile station acknowledges a paging call by sending an acknowledge in the fast paging acknowledge time slot (FP-ack).

Accordingly, it is characteristic of the proposed UMTS system that both uplink and downlink connections that are inactive at a given moment are not allocated physical channels during that time, which prevents unnecessary use of resources. Channels are always reserved using the same method independent of whether the connection is a circuit switched or a packet connection. One disadvantage of this known system is that the allocation of channels is not dynamic and, therefore, it is not easy to change the channels reserved for packet use. The reservation, paging, and acknowledge time slots are certain time slots and prior art systems take no position in the changing of those time slots. In addition, the known system does not particularly take into account the symmetry or asymmetry of the packet transmission when setting up a transmission channel. Hence, there is the disadvantage of the system not being very flexible. It is true the system is good with a great number of time slots but with a variable number of time slots, say, one or two, the system is not easily configurable.

BRIEF SUMMARY OF THE INVENTION

According to the present invention there is provided a time division multiple access (TDMA) radio telephone system for transmitting packet data including a base station and a mobile station, at least one logical channel comprising a TDMA slot for packet data communication between the base station and the mobile station, a control channel (C) comprising slots temporally spaced apart by a group of consecutive slots of at least one logical channel, and an information channel (I) comprising the group of consecutive slots separating the slots comprising the control channel (C).

This has the advantage that each logical channel reserved for packet data transmission is independent of any others. Thereby, facilitating the variation by a network of the number of packet data channels available to users. Thus, a network can dynamically allocate channels for packet data transmission according to need. Thus, only channels needed for packet data transmission are reserved as such.

In a preferred embodiment the control channel (C) includes an acknowledge/retransmission request burst (ARQ) for indicating error-free received data. Thus, if error-free data was not received or the data could not be reconstructed, retransmission of the data can be requested.

Preferably, the logical channel is a downlink logical channel for transmitting from the base station to the mobile station, and the control channel (C) is capable of transmitting packet paging (PP) data for informing the mobile station of incoming packet data.

Optionally, the control channel (C) is capable of transmitting a packet access grant PAG signal for acknowledging a channel reservation request (PRA) transmitted from the mobile station. Thus, the control channel is capable of acting as a reservation request acknowledge channel.

This invention proposes a flexible system in which time slots reserved for packet data can be changed according to need.

The multi-slot concept described below is based on channel independence: all physical radio channels are alike and one or more channels, up to the maximum number, can be dedicated for packet use. The media access control (MAC) algorithm of the layer above the physical layer is independent of the number of time slots in use. So the operator is free to launch the packet data transmission service using only a few time slots in a TDMA frame and, as the need arises, to upgrade the service using all time slots in a TDMA frame. If the application is e.g. GSM or DCS 1800 or some such derivative, one frame includes 8 time slots and it is therefore possible to dedicate from one to eight time slots for packet data use. Even if the network supports multi-slot packet data transmission a mobile station is still free to use only one time slot. Then even a simple mobile station is able to use the packet data service provided by the network.

A high-capacity cell can be built by dedicating more than one carrier wave for the packet radio service. The algorithm is independent of the number of time slots dedicated by the operator. An operator can start with one time slot and upgrade the service up to 8 time slots when the number of packet radio users grows.

Naturally, the number of carriers can also be increased, which means that multiple independent carriers are used.

BRIEF DESCRIPTION OF THE DRAWINGS

An embodiment in accordance with the invention is described below, by way of example only, with reference to the enclosed drawings, and in which.

DETAILED DESCRIPTION OF EMBODIMENTS OF THE INVENTION

A "frame" in this description means consecutive time slots of a logical channel, not consecutive TDMA frames with their time slots unless specifically described as such, of which there are eight in he GSM system, for example.

Figure 2:
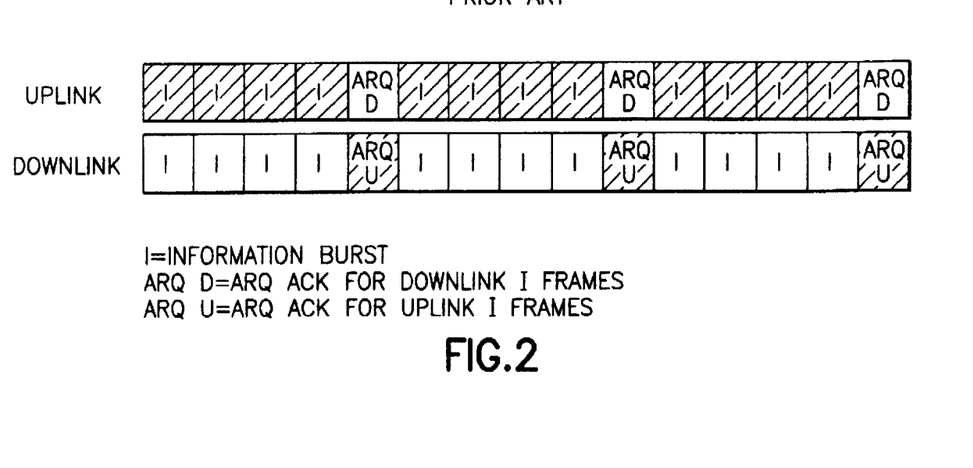
FIG. 2 shows the logical channel structure in a system in accordance with the invention.
Figure 3:
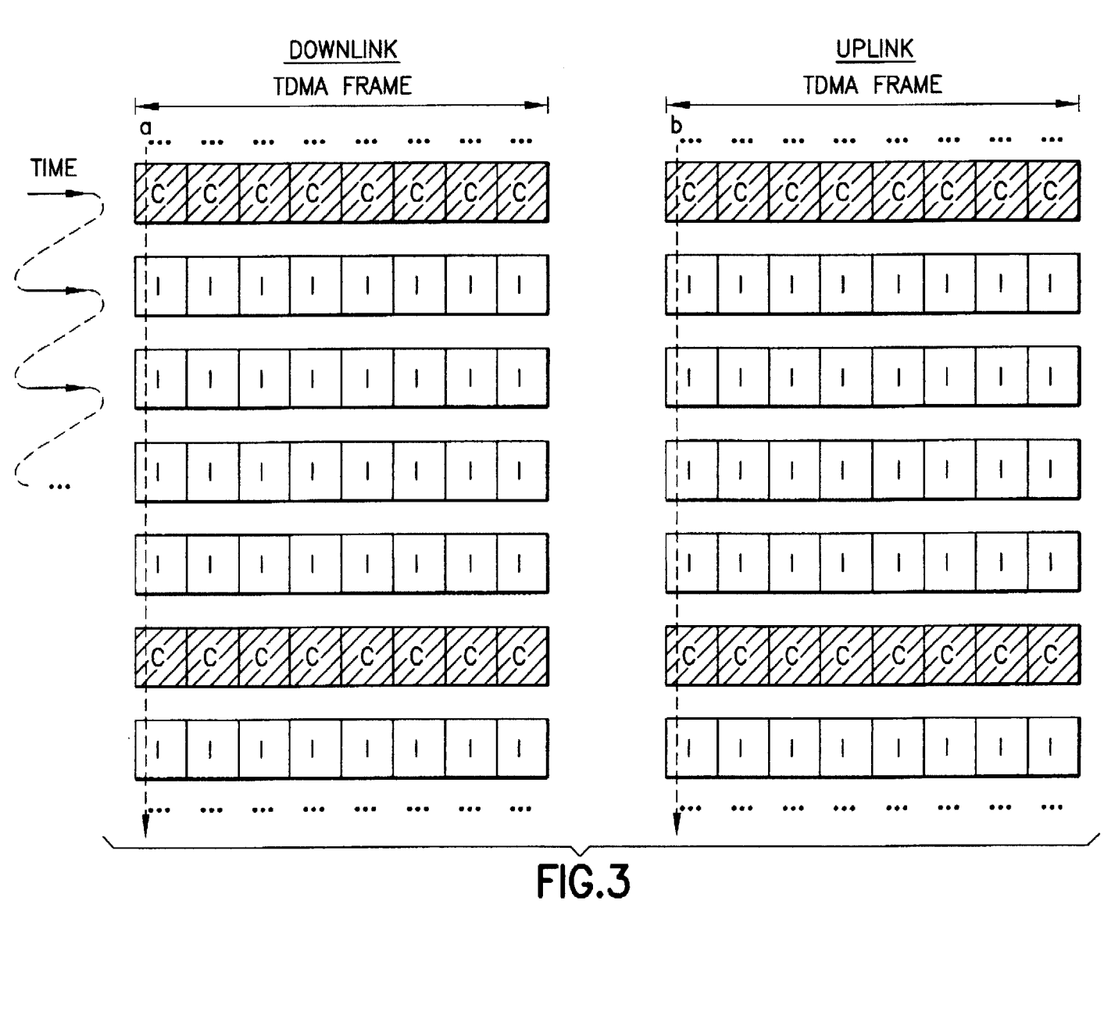
FIG. 3 shows the channel structure of a system using eight time slots.

Reference is now made to FIGS. 2 and 3. FIG. 3 shows downlink and uplink frames as seen from a base station in an 8-time-slot TDMA system. The structure in FIGS. 2 and 3 can be combined e.g. with GSM 51 multiframes if needed. In one of the TDMA frames going to the cell the base station sends only control data C, and all time slots of the next four frames include information I that can be packet data. In such a case, the number of information frames per unit time is decreased, resulting in a decrease in information rate also.

Correspondingly, when the base station is receiving from the cell (uplink direction), one TDMA frame includes only control time slots C used for receiving requests, acknowledges, etc. sent by mobile stations. The next four TDMA frames include only time slots for receiving information I. Let us now consider the situation from the point of view of one mobile station. A base station sends control or information to one mobile station in he same time slot of each TDMA frame. So the time slots sent to one mobile station are the time slots marked with the dotted arrow a. Hence, the mobile station receives one control burst in the time slot C and, after that, information I in four consecutive bursts if there is information for that mobile. This sequence is called a frame in his description. Frames are received as long as there is something to receive. Correspondingly, a base station will receive from one mobile station in consecutive time slots marked with the dotted arrow b. The sequence consisting of a control time slot C and four consecutive information time slots I is called a frame in this description.

FIG. 2 shows the (dedicated) frame structure. Uplink frames consist of time slots marked with the dotted arrow b in FIG. 3 as explained above and, correspondingly, downlink frames consist of time slots marked with the dotted arrow a.

This description involves a case in which four bursts are used, as explained above, but an I frame may also be longer or shorter. A four-burst I frame is only one alternative and it is possible to use TDMA frames of another length (8 bursts, for example). This is an optimization problem: the longer the frame, the longer the access delay and minimum packet size. Thus, the length or the frame in the physical layer is a system parameter.

When encoding four-burst frames in the physical layer, it is possible to use the same coding as on the stand-alone dedicated control channel (SDCCH) in the known GSM system. This code has a frame length of four bursts, or 456 bits. (A 228-bit block consisting of 184 bits of user data, 40 parity bits, and 4 tail bits is convolutionally encoded into 456 bits.) The interleaving depth is 4. The interleaving depth of 4, compared to 19 in circuit switched data transfer, reduces the transmission delay and minimum packet size. Alternatively, some other code, like Reed-Solomon, could be used to encode the frames.

Let us now consider the physical layer, with reference to FIG. 2 which should be interpreted as follows. If a base station is receiving packet data, the reception occurs in the gray I time slots. The base station sends an acknowledge in the downlink ARQ time slot. Hence, the connection is made up of the gray time slots. Correspondingly, when the base station is transmitting packet data, the connection is made up of the white time slots.

In layer 1 (the physical layer), an automatic retransmission request (ARQ) is used in a control time slot C to decrease the frame error rate when transferring from the physical layer to the upper layers. However, the use of ARQ is optional and need not be utilised nor included in the system. A data frame consists of 4 bursts which have had the error correction coding and frame check done for them. In this example, every fifth burst both in the downlink and uplink directions is used for control purposes. The frequency of control bursts may of course be increased from the proposed every fifth, optimizing efficiency and he power consumption of the mobile station. In the downlink direction, a control burst, including a retransmission request ARQ, is transmitted as a normal burst. In the uplink direction, the ARQ is transmitted in an access-like burst with a long training sequence. Then the data part of the burst will not include a random number as usual but those bits will be replaced by ARQ bits. Hence, only a small part of an access-type control burst (here it is proposed 12 bits) is used for the retransmission request ARQ. A mobile station that does not know the exact timing advance is then able to transmit an ARQ burst. In the uplink direction, the control bursts include only ARQ bits.

Having transmitted the four-burst frame a transmitter/receiver will listen to the frame acknowledge. An erroneous frame will be immediately retransmitted and if the frame is correctly received, the transmission continues. The frames can be numbered to indicate the correct frames when requesting an automatic retransmission. The ARQ acknowledge has the same frame number which it will selectively acknowledge. It is even possible that every burst has a separately encoded block which is numbered.

The raw information bit rate is about 19.7 kbps on one TCH/F channel with this configuration. By using all eight TDMA time slots for one Mobile Station (MS) the raw bit rate is about 158 kbps. The automatic retransmission request is used over the radio path, i.e. between a MS and base station BTS.

Above we discussed the physical layer in a system in accordance with the invention. Next we will have a look at the control layer MAC (multiple access control or media access control) above the physical layer. The control layer is used for transferring high level control messages. Still referring to FIG. 3. The MAC algorithm is on top of layer 1, i.e. every fifth burst is used for control purposes. Uplink and downlink channels are used asymmetrically and independently. The asymmetric use of a physical channel makes it possible to optimize the efficient use of channels. Data are usually sent in bursts with short intervals in one direction at a time. During another short interval the data flow may be in the opposite direction. This is carried out by separate channel allocation. Independence means that both uplink and downlink directions can be reserved independently of each other. The method can also be used symmetrically whereby uplink and downlink channels are reserved in pairs.

The high level control messages carried in he downlink control time slots C are packet paging P and packet access grant PAG. In the uplink, there is no special high level control time slot but a mobile station can send a packet random access (PRA) burst in any free I time slot to request a channel. In the physical layer, there is a special control time slot in the uplink direction and it is used for the ARQ.

Let us next consider a control time slot in the MAC layer. Both the packet paging P and the packet access grant PAG can be combined in one burst of a control time slot C or the paging and request may be sent in separate control time slots C. Having the packet paging P and the packet access grant PAG in the same control burst is the optimal case, and that is possible if the number of bits available in one burst in the cellular system is sufficient. Control bursts are encoded independently, i.e. no interleaving is used.

Figure 4:
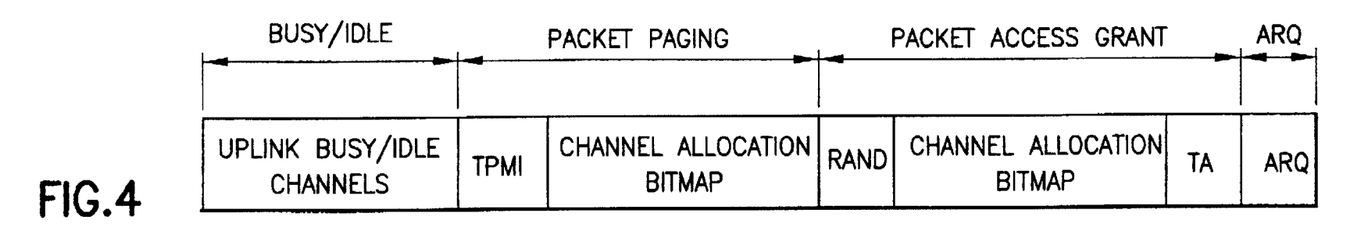
FIG. 4 shows he structure of the combined paging and acknowledge time slot.

Now referring to FIG. 4 illustrating the first alternative, i.e. the structure of a combined acknowledge and paging burst. A base station managing the radio resources monitors the states of the channels; in other words, which channels are free and which are reserved. It transmits a bitmap of free uplink channels in every downlink control burst as part of the burst; in FIG. 4, right at the beginning of the burst. The bitmap indicates to the mobile station he idle channels at that moment on which it can send a packet channel request in the form of an access burst. Also included in the control burst are the packet paging, packet access grant, and the automatic retransmission request ARQ of the physical layer. The packet paging P part of the burst is used for informing The mobile station about incoming packet data transmission. The paging also includes the temporary packet mobile identity TMPI, temporary logical link identity TLLI in GSM GRPS, and a description of the channels reserved by the network for the mobile terminated data transmission. The third part of the control burst, the packet access grant PAG, includes a random number used to distinguish various requesters, a bitmap of the channels reserved for the connection, and the timing advance TA. The last part of the burst includes an ARQ for acknowledging layer 1 messages.

Figure 5:
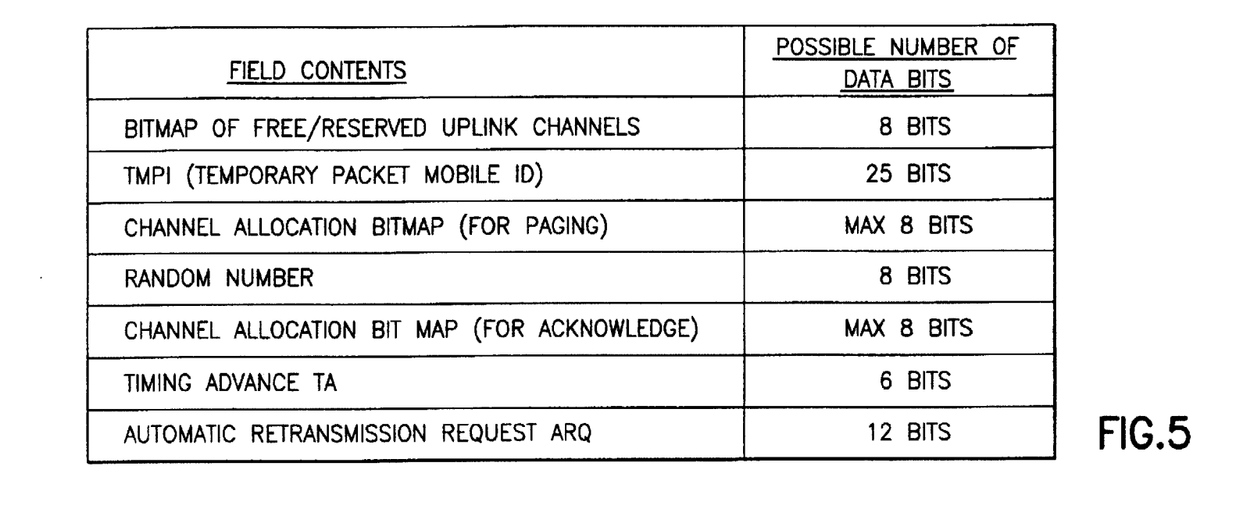
FIG. 5 shows an example of the bit contents of the fields presented in FIG. 4.

If the combined P and PAG burst were applied in the known GSM cellular system, the bit contents of the burst fields could be as shown in the exemplary table of FIG. 5. The P and PAG together would take up 55 bits and ARQ 12 bits, thus making up a total of 67 bits in the burst. The combined burst can be used in any application system provided that the number of information bits in the burst is sufficient, i.e. the number of information bits is the same or higher than in the GSM system.

Figure 6:
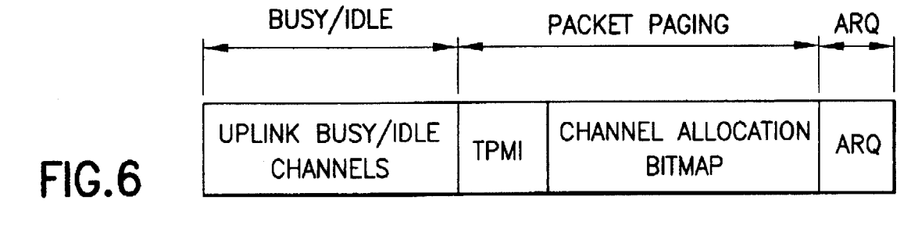
FIG. 6 shows an example of the structure of the paging time slot.
Figure 8:
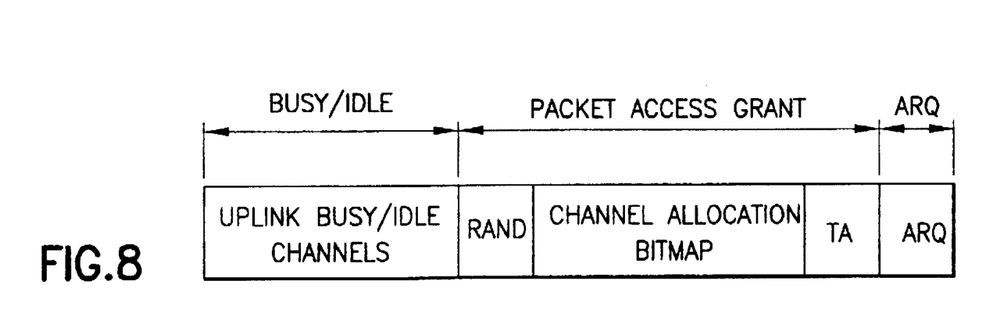
FIG. 8 shows the structure of the packet access grant time slot.

FIGS. 6 and 8 illustrate another alternative for transferring paging and acknowledge bursts. The bursts are sen separately with the P and PAG in their own control bursts. The P and PAG time slots share the downlink control channel. These time slots are sent alternately, for example. Every other control time slot C is for the paging P and every other for the acknowledge PAG. A mobile station will distinguish between paging and acknowledge by checking the steal bit in the burst. A P time slot will have "1" as the steal bit and a PAG time slot will have a "0" or vice versa. Occasionally there might be a need to send a packet access grant PAG instead of a packet paging P if there are no packet pagings coming to the cell at that moment. This can be done by stealing the P time slot for the PAG and notifying the mobile station with the steal bit.

Figure 7:
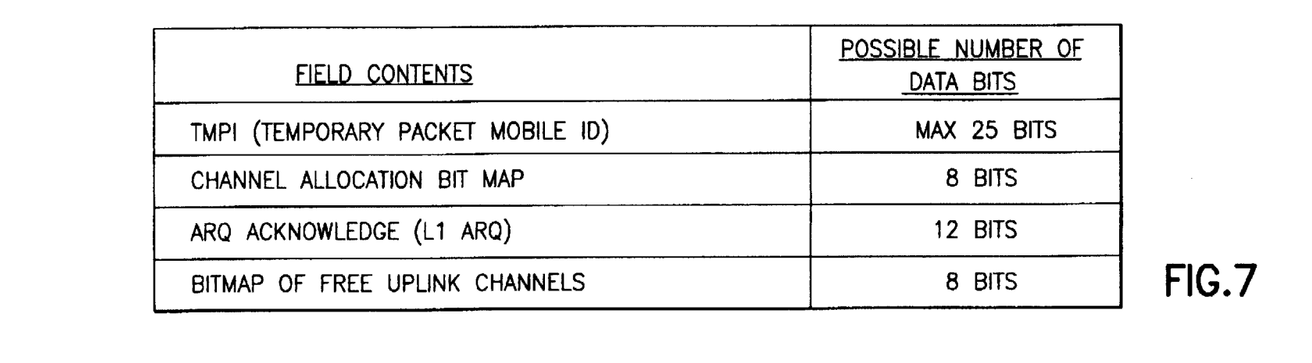
FIG. 7 shows an example of the bit contents of the paging time slot.

As shown in FIG. 6, the separate packet paging burst structure includes first the bitmap to indicate free/reserved channels. The bitmap consists of 8 consecutive bits if the TDMA frame is 8 time slots. The next field is the paging field in which the first part is the temporary mobile identity TMPI and the second part a bitmap which indicates to he mobile station the channels reserved by the network for the transmission of packet data, which the mobile station has to use for receiving packet data. Finally, there is the field for the automatic retransmission request, FIG. 7 shows as an example the bit contents of the paging field when he cellular network is a GSM network. The field includes 60 bits if the TMPI is the GSM's temporary mobile subscriber identity TMSI. A shorter TMPI, 25 bits, for example, will suffice.

As shown in FIG. 8, the separate packet access grant PAG burst includes first a bitmap to indicate free/reserved channels. The next field is the acknowledge field for the packet random access sent by a mobile station. There the first part is a random number included in the request sent by the MS. Then follows a bitmap that indicates to the mobile station the channels reserved by the network for the transmission of packet data. The mobile station will use these channels to send packet data. Finally, there is he field for the automatic retransmission request. The random number used in the request is used to indicate the packet access grant to a specific mobile station (mapping of PRA to PAG). Mobile stations in the cell will listen during this time slot and the random number will tell a particular mobile station that the acknowledge is meant for it. To decrease the probability of collision (should two mobile stations select the same random number) it is possible to use for the identification either the number of requested time slots or the priority or the time slot number of the packet random access (PRA) time slot (which refers to the time slot which the mobile station used for requesting a channel). These parameters are not shown in FIG. 8.

Figure 9:
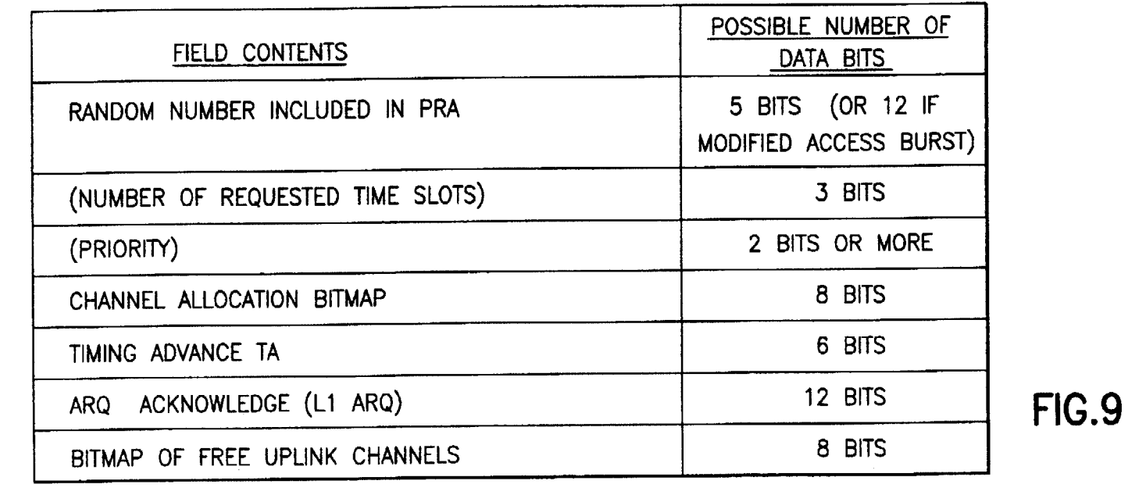
FIG. 9 shows an example of the bit contents of the packet access grant time slot.

The table in FIG. 9 shows the bit contents of the control time slot presented in FIG. 8 if the application system is the GSM. The bits indicating the number of requested time slots as well as those indicating the priority are optional.

So far we have described an embodiment of the inventive system mainly from the point of view of a base station. Let us now consider the transmission from a mobile station to a base station. The base station schedules the reservation of an uplink channel. It has the knowledge of free and reserved channels and that information is transmitted in every downlink control burst, as explained above. The bitmap consists of 8 bits, one for each time slot in a TDMA frame if the frame is a TDMA frame with 8 time slots. The reserved channels are marked with bit 1 and idle channels with bit 0. If the network is not using all 8 time slots for the packet transmission service, then only those channels that are used may be marked idle. The rest of the channels are treated as if they were reserved, i.e. bit 1 is sent.

Figure 10:
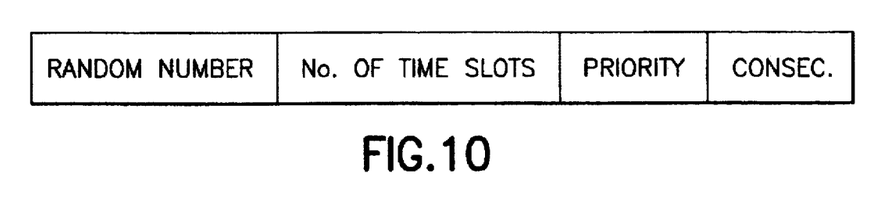
FIG. 10 shows the structure of the packet random access burst.

Referring to FIG. 10. A mobile station which has data in its buffer and wants to send it monitors the control bursts sent in the downlink C time slots. Monitoring is continued until the bitmap shows that an uplink channel is marked idle. As soon as the idle channel is found, an access burst (channel request) according to FIG. 10 is transmitted in an I time slot marked idle. This burst carrying the packet random access burst PRA is randomly selected as one of four, for example, if the frame used is four bursts. The packet random access PRA is similar to the access burst in the GSM system, for example, with a long training sequence. Then the data part of the burst will not include a random number as usual but those bits will be replaced by The PRA bits. Because of the long training sequence a mobile station which does not know the exact timing advance is able to send a PRA burst without problems. Possible collisions occurring when more than one mobile stations request a channel in the same time slot are handled with a back-off algorithm. An access burst consists of a random number sent back by the base station in the acknowledge burst, a number indicating how many time slots he mobile station wants, a four-level priority number, and finally a bit indicating whether or not the time slots have to be consecutive. The requirement or consecutive time slots is needed to support certain mobile classes. There might be a mobile station capable of handling, say, two packet time slots if they are consecutive in a TDMA frame but not if the time slots are a distance apart.

Figure 11:
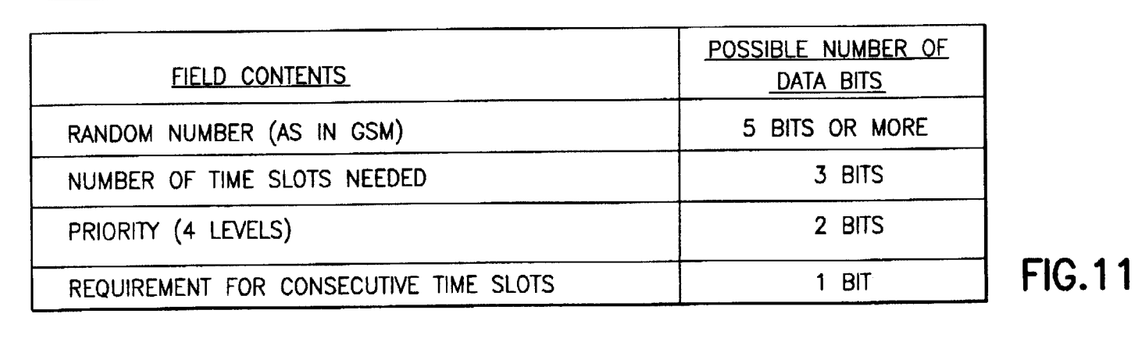
FIG. 11 shows an example of he bit contents of the packet random access burst.

FIG. 11 shows the possible bit contents of the fields. The burst consists of at least 11 bits. As soon as a base station receives an access burst PRA, it sends a packet access grant PAG in a downlink control burst C. If multiple consecutive access bursts are received before he next packet access grant can be transmitted, the priority or random selection is used to assign the channel for a mobile station. If there are not as many time slots available as requested, the base station can give as many as there are free.

When a mobile station has received an acknowledge PAG sent by a base station for a channel request PRA it starts to transmit packet data on the reserved channel consisting of one or more time slots, up to the maximum amount. It is possible to transmit during one reservation at least 128 octets which is the usual X.25 maximum packet size. 128 octets equals six 4-octet blocks. This means that the maximum amount of data transmitted during one reservation depends on the number of time slots used and that there has to be a limit value set in case the transmission fails and a retransmission is required. The limit value has to be more than 6, because in the case of retransmission 6 frames will not be enough to transmit all.

Figure 12:
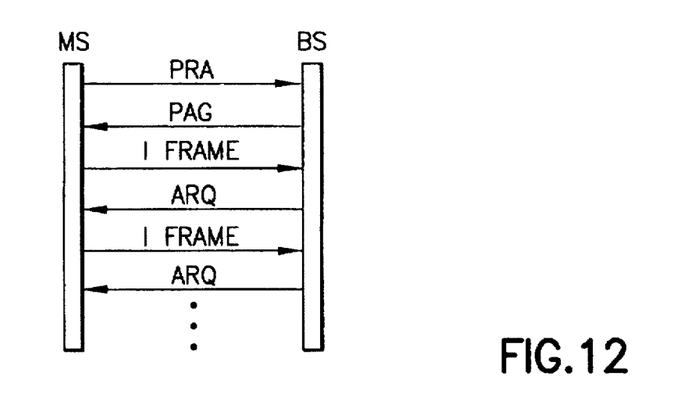
FIG. 12 shows the signalling chart of mobile originated packet transmission.

FIG. 12 shows a signalling chart for mobile originated packets. A mobile station MS sends a channel request PRA acknowledged by a base station in a packet access grant burst PAC. The mobile station transmits packet data in time slots of one frame and the base station acknowledges or sends a retransmission request. This goes on until all packet data have been transmitted or time-out occurs.

Figure 13:
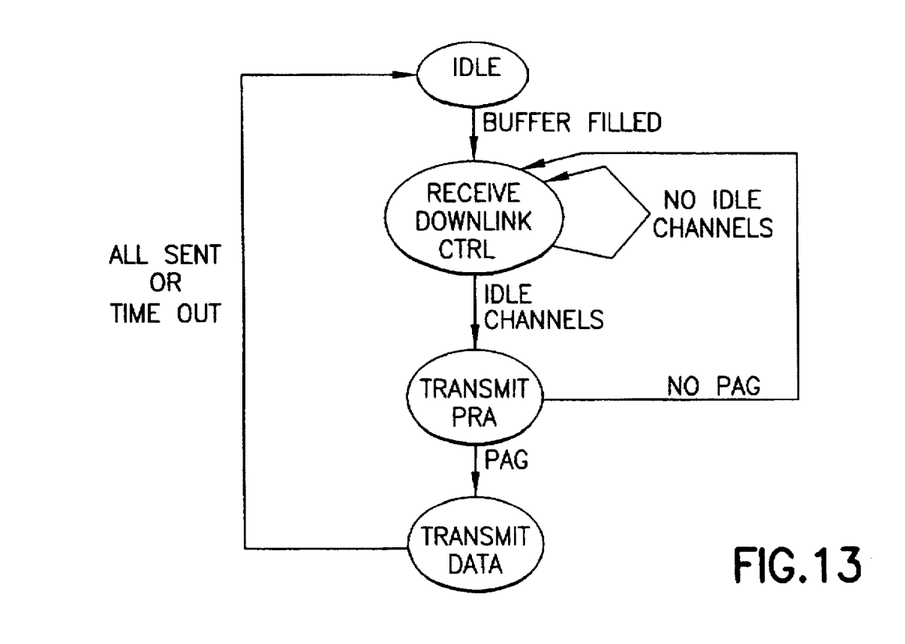
FIG. 13 shows the state transitions in mobile originated packet transmission.

FIG. 13 is a state transition diagram illustrating the events in a mobile station during packet transmission from a base station to the network. When the data buffer is full, the mobile station goes from idle state to receive state and receives the information in the first control time slot from the base station. It consults the bitmap to see whether there are any free channels, and if not, checks the information in the next control time slot. This goes on until a free channel is found. Immediately after that, a channel request is sent on the free channel and if the base station acknowledges, packet data is transmitted on the dedicated channel. If no acknowledge is received, the mobile station returns to receive control time slots and search for a free channel.

Figure 14:
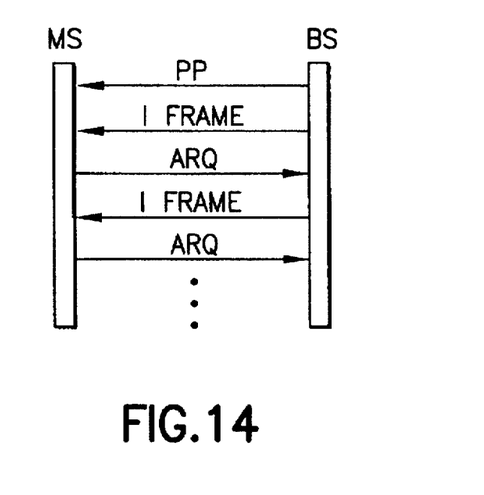
FIG. 14 shows the signalling chart of mobile terminated packet transmission.

FIG. 14 illustrates a case where a network sends packet data addressed to a mobile station MS. A base station initiates a downlink transmission by sending a packet paging P in a control time slot C. The packet paging includes the mobile station identity and the reserved time slots. These time slots begin in the next TDMA frame. As soon as the MS receives the packet paging it starts receiving in the defined time slots.

Packet pagings are transmitted in every consecutive time slot of a downlink control sequence to inform mobile stations about incoming packets. This means that a mobile station must listen to all packet paging channels in order to find out if there are packets coming to it. This of course uses energy stored in the mobile station's battery. To optimize the power consumption mobile stations can be divided into different paging groups according to the temporary identity or IMSI, for example. Then a mobile station has to listen to only one time slot in a TDMA frame instead of all the time slots. There can be eight time slots, so it is more practical to listen to one time slot only. The paging frequency can be still decreased to support discontinuous reception DRX. This, however, increases the delay and therefore the DRX should be a selectable mode for a mobile station. The DRX power saving function can also be combined with the paging burst used in the present GSM system by adding the code "incoming packet" in the burst. Then a mobile station will listen to standard pagings and the code will inform it about an incoming packet transmission. Then the mobile station will start listening to the packet paging channel P and receive the necessary information from that channel. Of course, the network needs to know whether the mobile station is listening to the standard paging channel or the packet paging channel. The mobile station sends this information in a short management message.

If the base station does not receive an ARQ acknowledge in a certain number of frames, say, in seven frames, it draws the conclusion that the mobile station is not receiving frames correctly. Then the packet paging will be repeated.

Figure 15:
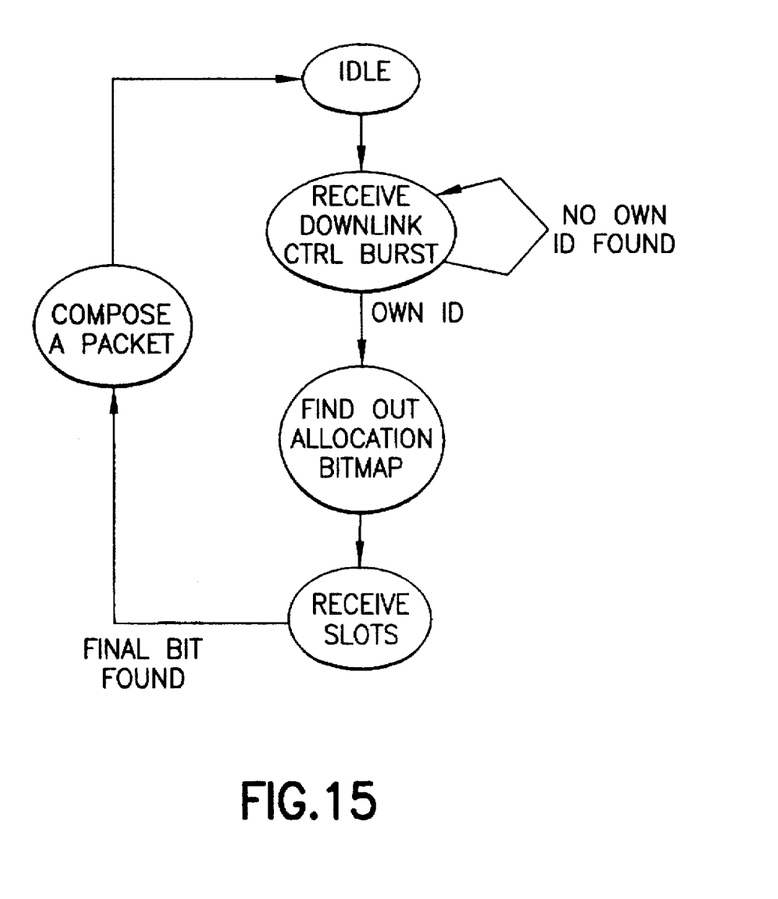
FIG. 15 shows the state transitions in mobile terminated packet transmission.

FIG. 15 shows a mobile station state transition diagram for the case presented in FIG. 14. Understanding the diagram is easy on the basis of the description related to FIG. 14, so further explanations are not needed. It is, however, pointed out that most of the time the mobile station is receiving control bursts and determining if there is a packet data transmission coming to it.

The frame used in the data link layer may be variable in length. A maximum length of, say, 128 octets, as in the X.25 protocol, can be chosen. A variable length reduces the number of acknowledges in the link layer and thus the number of reservations.

The system may be implemented in many ways within the scope of the invention defined by he claims set forth below. For example, the control time slots need not be as shown in FIG. 3 but they can be moved diagonally, as illustrated by FIG. 16.

Figure 16:
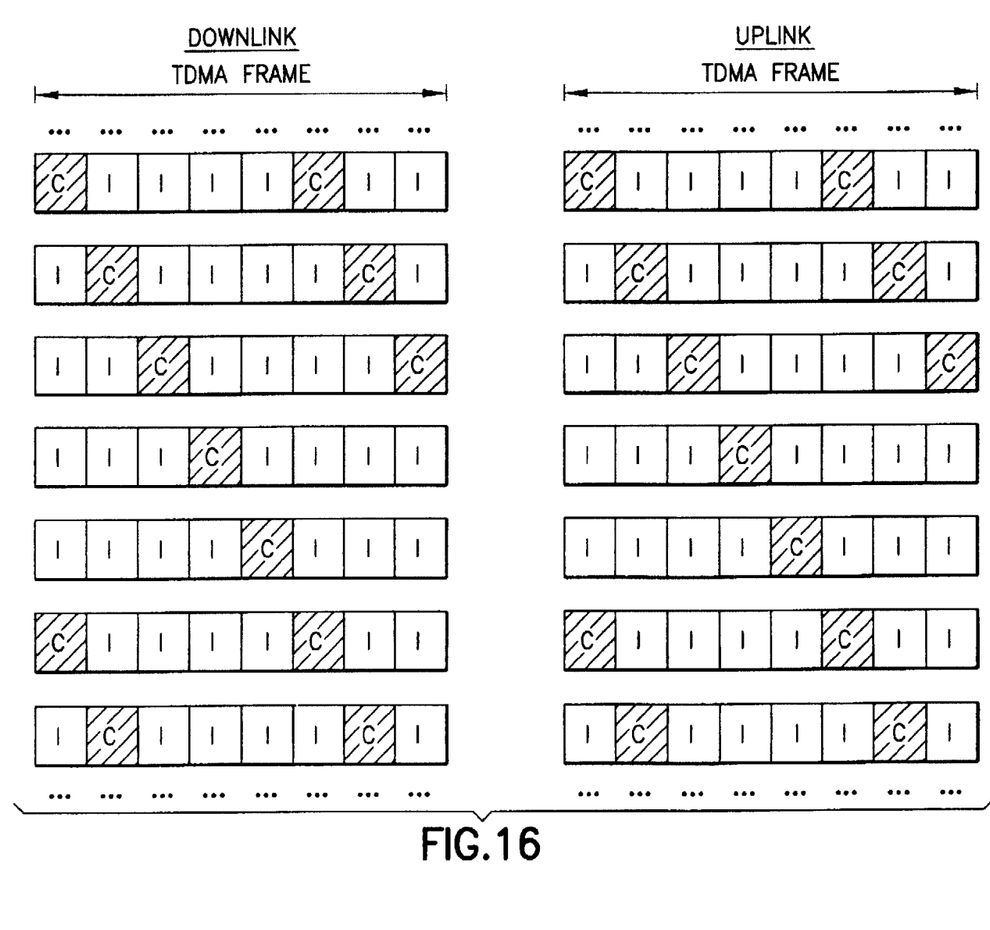
FIG. 16 shows variations of control time slots in a TDMA frame.

In each frame, the control time slot C is moved forward one time slot, thus creating a diagonal pattern of control time slots both in the uplink and downlink frames as shown in FIG. 16. A dedicated frame, however, still consists of a control time slot C and four information time slots I, as in the case illustrated by FIG. 3.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A time division multiple access (TDMA) radio telephone system for transmitting packet data including:
   a base station and a mobile station, and
   at least one logical channel comprising TDMA slots for transmitting packet data communication between the base station and the mobile station, individual ones of the TDMA slots of the at least one logical channel occurring in a succession of physical TDMA frames,
   the at least one logical channel having a control channel (C) comprising slots that are temporally spaced apart by a group of consecutive slots, and an information channel (I) comprising the group of consecutive slots that occur in successive physical TDMA frames and that separate the slots comprising the control channel (C), wherein the control channel (C) includes an acknowledge/retransmission request burst (ARQ) for indicating error-free received data.

2. A system according to claim 1, wherein said base station is responsive to a channel reservation request (PRA) transmitted from the mobile station as a system access type burst that includes information for specifying how many time slots the mobile station wants to be reserved for packet data transmission.

3. A system according to claim 2, wherein the channel reservation request (PRA) includes an identifier indicating how many consecutively occurring information channel time slots the mobile station wants to reserve.

4. A system according to claim 1 wherein in a downlink direction from the base station to the mobile station the acknowledge/retransmission request burst (ARQ) is part of a combined control channel burst (C) which includes both a packet paging (PP) and a packet access grant (PAG).

5. A system according to claim 4, wherein the control channel burst (C) includes a bitmap indicating free and reserved logical channels in an uplink direction from the mobile station to the base station.

6. A system according to claim 4, wherein the packet paging (PP) and the packet access grant (PAG) signal are sent in alternate time slots of the control channel (C) and both bursts include an identifier with which a mobile station can distinguish one from the other.

7. A system according to claim 4, wherein only packet access grant (PAG) signals are sent in the time slots of the control channel (C) if there are no packet pagings (PP) to send and the control channel burst includes an identifier with which a mobile station can distinguish one from the other.

8. A system according to claim 1, wherein in a downlink direction from the base station to the mobile station the acknowledge/retransmission request burst (ARQ) is part of a control channel burst (C) which also includes a packet paging (PP).

9. A system according to claim 1 wherein in a downlink direction from the base station to the mobile station the acknowledge/retransmission request burst (ARQ) is part of a control channel burst (C) which also includes a packet access grant (PAG).

10. A system according to claim 1, wherein for transmitting packet data from a mobile station to a base station the mobile station monitors control channel bursts transmitted on a downlink channel from the base station to the mobile station until a free channel dedicated for information transfer is identified, and in a time slot of an identified free channel the mobile station transmits a channel reservation request (PRA), and in response to receiving a packet access grant (PAG) signal from the base station the mobile station transmits packet data on the identified free channel.

11. A system according to claim 10, wherein the channel reservation request (PRA) signal comprises data indicative of a mobile station identifier, a number of time slots required for packet data transmission, and a priority of the channel reservation request (PRA).

12. A system according to claim 11, wherein the channel reservation request (PRA) further comprises data indicative of whether or not the time slots have to be consecutive.

13. A time division multiple access (TDMA) radio telephone system for transmitting packet data including:
   a base station and a mobile station, and
   at least one logical channel comprising TDMA slots for transmitting packet data communication between the base station and the mobile station, individual ones of the TDMA slots of the at least one logical channel occurring in a succession of physical TDMA frames,
   the at least one logical channel having a control channel (C) comprising slots that are temporally spaced apart by a group of consecutive slots, and an information channel (I) comprising the group of consecutive slots that occur in successive physical TDMA frames and that separate the slots comprising the control channel (C), wherein the logical channel is a downlink logical channel for transmitting from the base station to the mobile station and the control channel (C) is capable of transmitting packet paging (PP) data for informing the mobile station of incoming packet data, and wherein the packet paging (PP) data includes a bitmap indicating which time slots are reserved for downlink packet data transmission.

14. A system according to claim 13, wherein a mobile station listens to said packet paging data (PP) only on a channel assigned to the mobile station.

15. A system according to claim 14 wherein on said assigned channel said packet paging (PP) data is transmitted only in predetermined control time slots known to the mobile station and the mobile station listens to packet paging (PP) data only during the predetermined control time slots.

16. A system according to claim 13, wherein said packet paging (PP) data is transmitted in every downlink control channel time slot of a TDMA frame from the base station to the mobile station.

17. A time division multiple access (TDMA) radio telephone system for transmitting packet data including:
   a base station and a mobile station, and
   at least one logical channel comprising TDMA slots for transmitting packet data communication between the base station and the mobile station, individual ones of the TDMA slots of the at least one logical channel occurring in a succession of physical TDMA frames,
   the at least one logical channel having a control channel (C) comprising slots that are temporally spaced apart by a group of consecutive slots, and an information channel (I) comprising the group of consecutive slots that occur in successive physical TDMA frames and that separate the slots comprising the control channel (C), wherein the logical channel is a downlink logical channel for transmitting from the base station to the mobile station and the control channel (C) is capable of transmitting packet paging (PP) data for informing the mobile station of incoming packet data, wherein the control channel (C) is capable of transmitting a packet access grant (PAG) signal for acknowledging a channel reservation request (PRA) transmitted from the mobile station, and wherein the packet access grant (PAG) signal includes a bitmap indicating which time slots have been reserved for uplink packet data transmission.

18. A time division multiple access (TDMA) radio telephone system for transmitting packet data including:
   a base station and a mobile station, and
   at least one logical channel comprising TDMA slots for transmitting packet data communication between the base station and the mobile station,
   the at least one logical channel having a control channel (C) comprising slots that are temporally spaced apart by a group of consecutive slots, and an information channel (I) comprising the group of consecutive slots separating the slots comprising the control channel (C), wherein the logical channel is a downlink logical channel for transmitting from the base station to the mobile station and the control channel (C) is capable of transmitting packet paging (PP) data for informing the mobile station of incoming packet data, and wherein the packet paging (PP) data includes a bitmap indicating which time slots are reserved for downlink packet data transmission,
   wherein a mobile station listens to normal paging calls of the system for an identifier indicating an incoming packet data transmission, and responsive to a detection of said identifier the mobile station starts listening to said packet paging (PP) data.

19. A system for the radio transmission of packet data in a digital time division multiple access (TDMA) based cellular system of a type that includes at least one base station and at least one mobile station, wherein downlink direction logical channels from a base station to a mobile station comprise channels for the transmission of information (I) and control channels (C) including a paging channel for sending packet paging (PP) data with which the network informs the mobile station about an incoming packet data transmission and also a reservation request acknowledge channel on which the network transmits a packet access grant (PAG) to acknowledge a channel reservation request (PRA) transmitted by a mobile station on an uplink direction logical channel from the mobile station to the base station, wherein a number of time slots in a TDMA frame dedicated for packet data transmission is variable according to packet data transmission needs, wherein packet data is encoded into an information channel frame comprising N-1 information bursts and between information channel frames there is one control channel (C) burst, wherein the information transmission channel frames and the control channel bursts form N burst sequences, and wherein on the control channel is transmitted an acknowledge/retransmission request (ARQ) burst reporting one of that a received frame was error-free or requesting retransmission.

20. The system of claim 19, wherein the packet paging (PP) data includes a bitmap indicating which time slots are reserved for downlink packet data transmission.

21. The system of claim 19, wherein the channel reservation request (PRA) is formed as a system access type burst and includes information as to how many time slots the mobile station wants reserved for packet data transmission.

22. The system of claim 19, wherein the packet access grant (PAG) includes a bitmap indicating which time slots have been reserved for uplink packet data transmission from the mobile station.

23. The system of claim 19, wherein in the downlink direction the acknowledge/retransmission request (ARQ) burst is part of a control channel burst which includes both a packet paging (PP) data and a packet access grant (PAG).

24. The system of claim 23, wherein the control channel burst includes a bitmap indicating both free and reserved logical channels in the uplink direction.

25. The system of claim 19, wherein in the downlink direction, the acknowledge/retransmission request (ARQ) burst is part of a control channel burst which also includes a packet paging (PP) data.

26. The system of claim 25, wherein the control channel burst includes a bitmap indicating both free and reserved logical channels in the uplink direction.

27. The system of claim 19, wherein in the downlink direction, the acknowledge/retransmission request (ARQ) burst is a part of a control channel burst which also includes a packet access grant (PAG).

28. The system of claim 27, wherein the control channel burst includes a bitmap indicating both free and reserved logical channels in the uplink direction.

29. The system of claim 19, wherein the packet paging (PP) and the packet access grant (PAG) are transmitted in alternate time slots of the control channel (C), and the PP and PAG each include an identifier with which a mobile station can distinguish one from the other.

30. The system of claim 19, wherein only the packet access grant (PAG) is transmitted in time slots of the control channel (C) if there is no packet paging (PP) data to send, and the PAG and PP each include an identifier with which a mobile station can distinguish one from the other.

31. The system of claim 19, wherein when transmitting packet data from a mobile station to a base station the mobile station monitors a bit map transmitted on the downlink control channel until it identifies a free channel dedicated for information transfer, and in response to identifying a free channel, the mobile station transmits a channel reservation request (PRA) which the base station acknowledges with a packet access grant (PAG), and the mobile station immediately begins to transmit packet data on a channel assigned by the base station.

32. The system of claim 19, wherein the mobile station listens to packet paging (PP) data only on an assigned channel.

33. The system of claim 32, wherein on the assigned channel, packet paging (PP) data is transmitted only in predetermined control time slots known to the mobile station, and the mobile station listens to packet paging (PP) data only during the predetermined control time slots.

34. The system of claim 19, wherein a mobile station listens to first paging calls of the system, the first paging calls including an identifier indicating an incoming packet data transmission, and when detecting said identifier the mobile station starts listening to said packet paging (PP) data.

35. The system of claim 34, wherein the mobile station transmits a message to the system to indicate whether it listens to the first paging calls or to the packet paging (PP) data.

36. The system of claim 19, wherein if the base station does not receive an acknowledge/retransmission request (ARQ), the base station retransmits the packet paging (PP) data.

37. The system of claim 19, wherein the channel reservation request (PRA) includes an identifier for indicating a number of consecutive information channel time slots that are required.

38. The system of claim 19, wherein the packet paging (PP) data is transmitted in every time slot of a TDMA frame.

39. A time division multiple access (TDMA) radio telephone system for transmitting packet data, comprising:

a base station and N packet data mobile stations, and at least N logical channels each comprising M TDMA time slots that define a logical TDMA frame for transmitting packet data communications between the base station and individual ones of said N mobile stations, individual ones of said M TDMA time slots of a logical TDMA frame occurring during a same physical time slot number in a succession of physical TDMA frames; wherein each of said at least N logical channels comprises a control channel (C) and an information channel (I), said control channel (C) being transmitted during physical time slots that are temporally spaced apart by M-1 consecutive same numbered physical time slots of M-1 consecutive physical TDMA frames, said information channel (I) being transmitted during same numbered M-1 consecutive physical time slots of said M-1 consecutive TDMA physical frames; and wherein at least one of said N logical channels is used for transmitting packet data communications between the base station and an individual one of said N mobile stations.

* * * * *